United States Patent Office 3,692,671
Patented Sept. 19, 1972

3,692,671
RARE EARTH ION REMOVAL FROM
WASTE WATER
Howard L. Recht, Northridge, and Masood Ghassemi, Canoga Park, Calif., assignors to North American Rockwell Corporation
No Drawing. Filed Oct. 1, 1970, Ser. No. 77,390
Int. Cl. C02c 1/40
U.S. Cl. 210—45     15 Claims

ABSTRACT OF THE DISCLOSURE

A method is provided for chemically removing trivalent rare earth ions from waste water by treating the trivalent rare earth ion-containing water with a carbonate salt, such as an alkali metal carbonate, to form an insoluble rare earth carbonate precipitate and then separating the precipitate from the water. The rare earth ions may be regenerated in the form of a soluble rare earth salt, for example, by treating the separated rare earth carbonate precipitate with acid, such as hydrochloric or sulfuric acid.

CROSS-REFERENCE TO RELATED APPLICATIONS

This application is related to the following commonly assigned applications: application Ser. No. 731,540, filed May 23, 1968, for "Phosphate Removal from Waste Water" by E. V. Kleber et al. and since abandoned; a continuation-in-part application of Ser. No. 731,540, namely S.N. 77,389 filed Oct. 1, 1970 for "Removal of Phosphate from Waste Water" by E. V. Kleber et al. and an application, S.N. 77,391 filed Oct. 1, 1970, for "Water Decolorization" by M. Ghassemi et al.

BACKGROUND OF THE INVENTION

This invention relates to a method for the chemical removal of trivalent rare earth ions from waste water. It particularly relates to a method wherein a trivalent rare earth ion-containing waste water is treated with carbonate ions to form an insoluble rare earth carbonate precipitate.

The trivalent rare earth ions may be unreacted ions which have been used as precipitant for the removal of phosphorus-containing ions from waste water. The phosphorus-containing ions may be in the form of simple phosphates such as orthophosphate or complex phosphates such as pyrophosphate or tripolyphosphate. The waste water may be, for example, municipal waste waters such as the tertiary wastes from a secondary processing stage. In a typical treatment of municipal waste waters, there is a primary settling step for solids removal and a secondary treatment step for aeration, biological oxidation of organic matter and further solids removal. The combined primary and secondary treatments generally remove no more than about 20 percent of the phosphorus present in sewage, the remainder being passed on to the tertiary treatment stage.

The trivalent rare earth ions may also be unreacted ions which have been used as precipitant for the removal of coloring matter from waste water. The coloring matter may be natural or synthetic in origin and the waste water may be, for example, the effluent from pulp and paper mills, tanneries or textile mills. Illustrative pulp and paper mill effluents are the acid sulfite waste from sulfite pulping and the alkaline or acid bleach waste from the kraft process. The acid sulfite waste is a dark brown-colored liquor having a pH of about 2 to 4 when it is discharged from the pulp mill. The acid bleach waste in the kraft process results from the chlorine and hypochlorite bleaching stages and the alkaline bleach waste results from a caustic extraction stage which follows the chlorine bleaching.

The rare earth elements are known to form insoluble carbonates. These salts have been obtained, for example, by passing carbon dioxide through an aqueous suspension of the rare earth hydroxides or by the addition of an alkali carbonate to a cold neutral solution of the rare earth salts.

SUMMARY OF THE INVENTION

It is an object of the present invention to provide an efficient method for the direct precipitation of trivalent rare earth ions from waste water using a carbonate salt.

It is a further object of the present invention to provide a method for the removal or unreacted trivalent rare earth precipitant used in the precipitation of phosphorus-containing ions from waste water.

It is a further object of the present invention to provide a method for the removal of unreacted trivalent rare earth precipitant used in the precipitation of coloring matter from waste water such as the effluent from pulp and paper mills, tanneries and textile mills.

Further objects and advantages will become apparent upon reading the undergoing specification and claims.

Briefly stated, the invention comprises a method for chemically removing trivalent rare earth ions from waste water by precipitating the rare earth ions in the water with a carbonate ion. The carbonate ion is preferably provided by an alkali metal carbonate such as sodium or potassium carbonate. The carbonate ions combine with the rare earth ions to form an insoluble rare earth carbonate precipitate which is removed from the water, preferably by settling and/or filtration. The rare earth ions may be regenerated in the form of a soluble rare earth salt such as lanthanum chloride or lanthanum sulfate, for example, by treating the separated rare earth carbonate precipitate with acid.

DESCRIPTION OF THE PREFERRED EMBODIMENTS

The present invention is broadly directed to a method for chemically removing trivalent rare earth ions from waste water by directly precipitating the rare earth ions in the water by treating the water with carbonate ion, preferably provided by an alkali metal carbonate, to form an insoluble rare earth carbonate precipitate which is then separated from the water. The rare earth ions are preferably removed at a pH of about 7 to 8 employing an ionic equivalence ratio of carbonate ion to rare earth ion of 2:1 to 4:1. However, it will be appreciated that lesser quantities of carbonate ions will be added to the waste water if the waste water already naturally contains carbonate or bicarbonate ions.

The rare earth ions are regenerated in the form of soluble rare earth salts, such as lanthanum chloride or lanthanum sulfate, in accordance with one of several regeneration techniques. The rare earth carbonate precipitate, after separation from the waste water such as by filtration, may be heated by conventional technique in a kiln or other furnace to drive off carbon dioxide. The rare earth component of the precipitate is converted to rare earth oxide during the regenerative heating step. The ash which remains after the carbon dioxide and water are driven off is dissolved in acid, such as dilute hydrochloric or sulfuric acid, to convert the rare earth oxide to a soluble rare earth salt. The rare earth ions may be regenerated in the form of soluble rare earth salts without forming the rare earth oxide by treating the separated rare earth carbonate precipitate with acid, such as hydrochloric or sulfuric acid, or strong alkali, such as sodium or potassium hydroxide. When alkali is used, the rare earth hydroxide product may be separated and dissolved, along with any remaining carbonate, in acid, such as hydrochloric or sulfuric acid, to form a more soluble rare earth salt.

The carbonate salts used herein are preferably alkali metal carbonates such as sodium or potassium carbonate. Any other carbonate salt may be used, however, as long as it is sufficiently soluble to react with rare earth ion in an aqueous medium. The term "carbonate" as used herein is intended to include the divalent carbonate radical $CO_3^=$ and the monovalent bicarbonate radical $HCO_3^-$. The bicarbonate anion may be generated in situ by using carbon dioxide at a pH above about 6 according to the following ideal equation: $CO_2 + OH^- \rightarrow HCO_3^-$.

Although, for the purpose of illustration, the invention will be described with respect to the removal of trivalent rare earth ions from phosphate-containing waste waters and the effluent from pulp and paper mills, tanneries and textile mills, it should be understood that the present method is applicable to the removal of trivalent rare earth ions from waste waters in general, including natural and industrial waters. The term "rare earth" as used herein refers to the lanthanide series of elements, atomic numbers 57–71, and to yttrium, atomic number 39.

The method of the present invention can be used to remove unreacted trivalent rare earth ions used in the method for removing phosphorus-containing ions from waste water set forth in commonly assigned application Ser. No. 731,540, supra, and the continuation-in-part application derived therefrom Ser. No. 77,389. In these commonly assigned applications, a method is disclosed for chemically treating waste water to remove phosphorus-containing ions present therein by adding a trivalent rare earth salt, generally as a mixture of such salts, to the waste water to react with the phosphorus-containing ions to form an insoluble rare earth phosphorus-containing precipitate which is then separated from the waste water. This method is of particular utility for a tertiary stage chemical treatment of municipal waste waters for a substantially complete removal of its phosphorus content whereby the phosphate present in the secondary effluent from a water treatment plant is precipitated. While this method is of particular utility for chemically removing phosphorus ions from waste water in a tertiary processing stage, it has been found by M. Ghassemi and H. L. Recht that raw sewage may also be effectively treated in a primary treatment stage with a trivalent rare earth ion precipitant for the removal of phosphate therefrom. In addition to using trivalent rare earth ion alone, a combination precipitation treatment may be used, particularly where it is desired to avoid subsequent regeneration of the rare earth precipitate, in which the waste water is treated with aluminum (III), iron (III) or calcium (II) salts preceding or concurrent with the use of lesser quantities of rare earth precipitants. The rare earth precipitants are preferably added to the waste water in the form of a rare earth chloride, sulfate or hydroxide. It is preferred to use a stoichiometric quantity or up to 50 percent excess of the trivalent cation for purposes of precipitation in order to obtain a minimally hydrolyzed simple phosphate product, i.e., a cation to anion equivalence ratio between 1:1 and 1.5:1. However, depending upon other steps in the process, a cation to anion equivalence ratio varying from 0.5:1 to 5:1 is generally preferred.

The rare earth precipitant in these commonly assigned applications is regenerated by treating the rare earth phosphorus-containing ion precipitate, usually a phosphate precipitate, with a strong acid, such as sulfuric acid, or a strong or weak alkali to form a rare earth salt. When acid is used, a mixed phosphate and rare earth salt solution is produced. The rare earth is precipitated from this solution as the oxalate which is ignited to form the oxide. The rare earth oxide may be added directly to an acidic water or treated with acid, such as hydrochloric or sulfuric acid, to form a soluble rare earth salt. When alkali is used, preferably concentrated aqueous sodium hydroxide at a pH greater than 11 or concentrated aqueous sodium carbonate or bicarbonate, a relatively insoluble rare earth hydroxide or carbonate and a soluble phosphate are produced and separately recovered. The rare earth hydroxide may be reused in acidic waters directly or may be reacted with an acid, such as hydrochloric or sulfuric acid, to form a more soluble rare earth salt. The alkali regenerant solution containing dissolved phosphate, such as sodium phosphate, is treated with lime after removal of the insoluble rare earth hydroxide, such as by filtration, to reconstitute the alkali regenerant and form an insoluble precipitate, e.g., $Ca_{10}(OH)_2(PO_4)_6$.

According to the present invention, an improvement is provided in the method for removing phosphorus-containing ions, generally in the form of simple phosphates such as orthophosphate or complex phosphates such as pyrophosphate or tripolyphosphate, from waste water using trivalent rare earth salts. According to this improvement, carbonate anion, preferably provided by an alkali metal carbonate, is added to the waste water to react with unreacted trivalent rare earth cation to form an insoluble rare earth carbonate precipitate in the water which is then separated from the water. The carbonate precipitant is added to the waste water either prior to, at the same time or after the addition of the rare earth precipitant to the phosphate-containing water. The carbonate ion is normally added to the waste water in excess of the quantity required for complete reaction with all of the unreacted rare earth ions in accordance with the following ideal equation wherein lanthanum ion is used as representative of the trivalent rare earth ions:

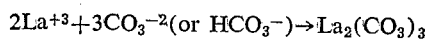

$$2La^{+3} + 3CO_3^{-2}(\text{or } HCO_3^-) \rightarrow La_2(CO_3)_3$$

It is generally preferred to use an ionic equivalence ratio of carbonate ion to residual unreacted rare earth ion of 2:1 to 4:1. The rare earth phosphate precipitate can be removed from the substantially phosphate-free waste water, such as by settling and/or filtration, before the carbonate precipitant is added in those instances where the carbonate precipitant is added to the waste water after the addition of the rare earth precipitant. When the rare earth carbonate precipitate is recovered separately from the rare earth phosphate precipitate, the rare earth precipitant ions in the rare earth carbonate precipitate are preferably regenerated in the form of soluble rare earth salts by treating the rare earth carbonate precipitate with acid, such as hydrochloric or sulfuric acid. When the carbonate precipitant is added to the phosphate-containing water either prior to or at the same time as the rare earth precipitant, precipitated rare earth phosphate and rare earth carbonate are recovered together from the substantially phosphate-free waste water such as by settling and/or filtration and regeneratively treated, preferably with strong alkali such as concentrated sodium hydroxide or potassium hydroxide.

In a preferred embodiment of the improved method for removing phosphates and other phosphorus-containing ions from waste water, trivalent rare earth precipitant is added to the waste water at an ionic equivalence ratio of rare earth cation to phosphorus anion of 0.5:1 to 5:1 or, more preferably, at a cation to anion equivalence ratio of 1:1 to 1.5:1. Carbonate precipitant, preferably in the form of sodium or potassium carbonate, is then added to the waste water at an ionic equivalence ratio of carbonate anion to rare earth cation of 1.5:1 to 4:1 or, more preferably, at an anion to cation equivalence ratio of 1.5:1 to 2:1. It is understood, of course, that if the quantity of residual unreacted rare earth ion can be determined in advance of the addition of carbonate precipitant, the carbonate anion to rare earth cation equivalence ratio may be based on the residual unreacted rare earth ion content of the waste water rather than the original quantity of rare earth precipitant added to the waste water. As stated previously, the ionic equivalence ratio of carbonate anion to residual unreacted rare earth cation is preferably 2:1 to 4:1. The pH of the phosphate-containing waste water is preferably maintained at about 7 to 8 by adjustment with acid such as sulfuric acid or base such as sodium hydroxide as required. The rare earth phosphate and carbonate precipitates which form in the waste water are separated from the substantially phosphate-free waste water by filtration or other conventional technique and the rare earth precipitates and waste water separately recovered. The recovered rare earth phosphate and carbonate precipitates are preferably reacted with alkali in the form of sodium or potassium hydroxide to form a rare earth hydroxide precipitate in a solution containing, for example, sodium phosphate, sodium hydroxide and sodium carbonate. The rare earth hydroxide precipitate and the alkali-containing solutions are separately recovered by removing the rare earth precipitate by filtration. The rare earth hydroxide precipitate may be used directly in acidic waters as a precipitant or reacted with acid, such as hydrochloric or sulfuric acid, to form a more soluble rare earth salt. The soluble rare earth salt can be returned to the phosphate-containing waste water for reuse to precipitate residual phosphates if any remain in solution.

The process of the present invention can also be used to remove unreacted trivalent rare earth ions used in the method for removing coloring matter from waste water set forth in the commonly assigned application for "Water Decolorization," S.N. 77,391 filed Oct. 1, 1970 by M. Ghassemi et al. In this commonly assigned application, a method is disclosed for chemically removing coloring matter from waste water, and particularly for removing colored lignins, tannins and flavanoids from the effluent from pulp and paper mills, tanneries and textile mills, by directly precipitating the coloring matter in the water by treating the coloring matter-containing water with a trivalent rare earth salt, generally as a mixture of such salts, to form an insoluble rare earth precipitate containing the coloring matter which is then separated from the water. The rare earth precipitant salt, such as lanthanum chloride or lanthanum sulfate, is regenerated by first heating the rare earth precipitate to form rare earth oxides and to drive off the organic components by converting them to carbon dioxide and water. The rare earth oxide can be used directly in acidic waters as a precipitant or converted to a soluble rare earth salt by using acid such as dilute hydrochloric or sulfuric acid. The trivalent rare earth precipitant is conveniently employed in the form of its chloride, hydroxide or sulfate. The decolorization of the waste water is preferably performed at a pH of about 3 to 14. With respect to kraft process pulping waste, it is generally preferred to treat the alkaline bleach waste at a pH of about 5 to 8 and the acid bleach waste at a pH of about 8 to 14. With respect to acid sulfite pulping process waste, a pH of 5 to 9 is generally preferred. The quantity of precipitant required to decolorize a given colored water may be determined experimentally by treating samples of the water with varying quantities of the precipitant and selecting the dosage which yields the desired degree of decolorization. Lime (CaO) may be used to aid trivalent rare earth ions in the removal of coloring matter from water. The lime, when used, can also act to precipitate unreacted rare earth ion as the hydroxide. The lime is added to the colored waters either before, after or at the same time that the trivalent rare earth precipitant is added to the water. In addition to lime or other calcium (II) coagulants, conventional iron (III), aluminum (III), and polyelectrolyte may be used in conjunction with rare earth precipitant to effect color removal.

According to the present invention, an improvement is provided in the method for removing coloring matter from water using trivalent rare earth salts. According to this improvement, carbonate anion, generally provided by an alkali metal carbonate, is added to the water to react with unreacted trivalent rare earth cation to form an insoluble rare earth carbonate precipitate in the water which is then separated from the water. The carbonate precipitant is added to the water either prior to, at the same time or after the addition of the rare earth precipitant to the coloring matter-containing water. The carbonate ion is normally added to the water in excess of the quantity required for complete reaction with all of the unreacted rare earth ions. It is generally preferred to use an ionic equivalence ratio of carbonate ion to residual unreacted rare earth ion of 2:1 to 4:1. The rare earth ions are regenerated in the form of soluble rare earth salts, such as lanthanum chloride, by heating the insoluble rare earth carbonate precipitate and/or coloring matter-containing rare earth precipitate, after separation from the water such as by filtration, to form rare earth oxide by driving off carbon dioxide in the case of the carbonate precipitate or by driving off the organic components in the case of the coloring matter-containing precipitate by converting the organic components to carbon dioxide and water. The rare earth oxide is then converted to a soluble rare earth salt by using acid. When trivalent rare earth cation is being used for removing coloring matter from the effluent from pulping mills which employ a bleaching operation, the rare earth oxide can conveniently be dissolved in the acid waste from the bleaching operation to reconstitute the rare earth precipitant.

In a preferred embodiment of the improved process for removing coloring matter from waste water wherein trivalent rare earth ions are used to directly precipitate the coloring matter in the water, carbonate precipitant is added to the water at an ionic equivalence ratio of carbonate anion to rare earth cation of 1.5:1 to 4:1 or, more preferably, at an anion to cation equivalence ratio of 1.5:1 to 2:1. If the quantity of residual unreacted rare earth ion is known, an ionic equivalence ratio of carbonate anion to unreacted rare earth cation of 2:1 to 4:1 is preferably used. The pH of the coloring matter-containing waste water is preferably maintained at about 7 to 8 by adjustment with acid or base as required.

EXAMPLE 1

A series of six tests was run in which solutions of lanthanum nitrate [$La(NO_3)_3$] were added to stirred phosphate solutions which contained $Na_2HPO_4$ at a concentration of 12 milligrams P/liter ($3.87 \times 10^{-4}$ M). Solutions of pH 5, 5.5, 6, 7, 8 and 9 were prepared by adjustment with additions of either hydrochloric acid or sodium hydroxide solutions. To these solutions were added 210 milligrams per liter of sodium bicarbonate ($2.5 \times 10^{-3}$ M). The lanthanum additions were at a 1:1 lanthanum-to-phosphate molar ratio. The precipitates were allowed to settle and the solutions then filtered. The obtained precipitates and filtrates were analyzed. The phosphate-phosphorus concentrations were reduced from 12 milligrams per liter to less than 0.01 milligrams per liter at pH 5 and pH 5.5. Residual phosphate-phosphorus concentrations of about 0.07, 0.15, 0.36 and 0.86 milligram per liter were obtained at pH 6, 7, 8 and 9, respectively. Similar experiments conducted in the absence of sodium bicarbonate using lanthanum additions at a 1:1 lanthanum-to-phosphate molar ratio and a concentration of 12 milligrams P/liter yielded residual phosphate-phosphorus concentrations of less than 0.01 milligrams per liter over the pH range 5–9.

EXAMPLE 2

A 2:1 lanthanum-to-phosphate molar ratio ($7.72 \times 10^{-4}$ M La) was used at a pH of 7.2 following the procedure of Example 1 and resulted in a residual phosphate-phosphorus concentration of less than 0.01 milligrams per liter.

EXAMPLE 3

To stirred solutions of lanthanum nitrate which were $7.72 \times 10^{-4}$ M in $La(NO_3)_3$ were added 210 milligrams per liter of sodium bicarbonate ($2.5 \times 10^{-3}$ M) in a series of three tests. Solutions of pH 6, 7 and 8 were prepared by addition of either hydrochloric acid or sodium hydroxide solution. The pH 6 solution developed fine precipitates which agglomerated into larger particles on standing. The pH 7 and 8 solutions immediately developed large flocs which settled readily. The precipitates were allowed to settle and the pH 7 and 8 solutions then filtered and the filtrates acidified with hydrochloric acid to a pH of less than 4 and analyzed for lanthanum by an extraction-flame photometric technique capable of detecting lanthanum concentrations as low as 0.5 milligrams La/liter ($3.6 \times 10^{-6}$ M). No lanthanum was detected in either the pH 7 or 8 filtrates.

EXAMPLE 4

A sample of acid bleach waste from a kraft pulping mill was diluted 10 to 1 (10 parts diluent to 1 part acid bleach waste) with distilled water. The color of the diluted sample at pH 7 was 1000 platinum-cobalt (Pt-Co) units [see Standard Methods for the Examination of Water and Wastewater, 12th ed., Amer. Pub Health Assn. (New York, 1965), p. 127 et. seq.]. The sample was placed in a stirring apparatus and stirred rapidly at 90 r.p.m. for 2 minutes. The stirring rate was then reduced to 20 r.p.m. and the stirring was continued at this rate for andditional 10 minutes. After the stirring was completed, the sample was allowed to settle for 20 minutes. After the period of quiescent settling, sodium bicarbonate was added to the solution until a pH greater than about 6 was reached to precipitate unreacted lanthanum as lanthanum carbonate. Following the addition of sodium bicarbonate, the supernatant was filtered through Whatman No. 40 filter paper and the color of the filtrate was determined at a wavelength of 420 m$\mu$ using a Lumetron Colorimeter (Model 402E) (Photovoit Corporation, New York, N.Y.) which had been calibrated against platinum-cobalt color standards. The color of the supernatant after filtration was measured at an adjusted pH of 7 to be 400 platinum-cobalt units which represented a 60 percent reduction in color.

EXAMPLE 5

A sample of acid sulfite pulping waste water from an acid sulfite pulping mill was filtered through Whatman No. 2 filter paper and diluted 20 to 1 with distilled water. The diluted sample had a color of 33,000 platinum-cobalt units at pH 2.5. The sample was treated with lanthanum nitrate until it was $7.5 \times 10^{-3}$ molar. The sample was then treated as described in Example 4 with sodium bicarbonate being added to the solution after the period of quiescent settling until a pH greater than about 6 was reached to precipitate unreacted lanthanum as lanthanum carbonate. The color of the supernatant after filtration was measured at an adjusted pH of 2.5. The color measured 6,930 platinum-cobalt units which represented a 78.7 percent reduction in color.

We claim:

1. In a method wherein undesired materials present in a waste water are precipitated therefrom by chemically treating the waste water with an excess amount of a trivalent rare earth salt so that trivalent rare earth cations are present in the waste water following the precipitation step, the improvement for removing the rare earth cations from the waste water comprising adding a carbonate anion to the waste water to react with the trivalent rare earth cations to form an insoluble rare earth carbonate precipitate in the waste water and separating this precipitate from the waste water to provide a waste water substantially free from rare earth cations.

2. The method of claim 1 in which the carbonate precipitant used to form the rare earth carbonate precipitate is added to the waste water in the form of an alkali metal carbonate.

3. The method of claim 1 in which carbonate anion is added to the waste water in sufficient quantity to provide an ionic equivalence ratio of carbonate anion to rare earth cation of 2:1 to 4:1.

4. In the method for chemically treating waste water to remove phosphorus-containing anions present therein by adding an excess amount of a trivalent rare earth cation to the waste water to react with the phosphorus-containing anions to form an insoluble rare earth phosphorus-containing precipitate in the waste water and rare earth cations therein and separating this precipitate from the waste water, the improvement comprising adding a carbonate anion to the waste water to react with unreacted trivalent rare earth cation to form an insoluble rare earth carbonate precipitate in the waste water and separating this precipitate from the waste water to provide a waste water substantially free from rare earth cations.

5. The method of claim 4 in which the rare earth precipitates separated from the waste water are reacted with an acid or strong alkali regenerant to regenerate the rare earth precipitant.

6. The method of claim 5 in which the regenerant is sodium hydroxide or potassium hydroxide.

7. In a recycle process for chemically treating waste water to remove phosphates present therein wherein the phosphate-containing waste water is reacted with a trivalent rare earth precipitant at an ionic equivalence ratio of rare earth cation to phosphate anion of 0.5:1 to 5:1 to form an insoluble rare earth phosphate precipitate in the waste water, the phosphate precipitate and the substantially phosphate-free waste water are separately recovered, the recovered phosphate precipitate is reacted with strong alkali to form a rare earth hydroxide precipitate in a phosphate-hydroxide solution, the rare earth hydroxide precipitate and the phosphate-hydroxide solution are separately recovered, the rare earth hydroxide precipitate is reacted with acid to form a corresponding soluble rare earth salt, and the soluble rare earth salt is returned to the process for recycle therein, the improvement comprising adding a carbonate anion to the waste water to react with unreacted trivalent rare earth precipitant to form an insoluble rare earth carbonate precipitate which is separated from the waste water and reacted with said strong alkali to form a rare earth hydroxide precipitate which is recovered and reacted with said acid to form a corresponding soluble rare earth salt which is returned to the process for recycle therein.

8. The process of claim 7 in which the carbonate precipitant used to form the rare earth carbonate precipitate is added to the waste water in the form of an alkali metal carbonate.

9. In the method for chemically treating waste water to remove organic coloring matter present therein wherein the organic coloring matter-containing waste water is treated with a trivalent rare earth cation to form an insoluble rare earth precipitate containing the coloring matter in the waste water and the rare earth precipitate is separated from the waste water, the improvement comprising adding a carbonate anion to the waste water to react with unreacted trivalent rare earth cation to form an insoluble rare earth carbonate precipitate in the waste water and separating this precipitate from the waste water.

10. The method of claim 9 in which the waste water is from a pulp and paper mill.

11. The method of claim 9 in which the waste water is from a kraft pulping mill.

12. The method of claim 9 in which the waste water is from an acid sulphite pulping mill.

13. The method of claim 9 in which the waste water is from a tannery.

14. The method of claim 9 in which the waste water is from a textile mill.

15. The method of claim 9 in which the carbonate precipitant used to form the rare earth carbonate precipitate is added to the water in the form of an alkali metal carbonate.

References Cited
UNITED STATES PATENTS

| | | | |
|---|---|---|---|
| 2,872,286 | 2/1959 | Finzel | 210—42 X |
| 3,259,568 | 7/1966 | Jordan et al. | 210—42 X |
| 3,617,569 | 11/1971 | Daniels et al. | 210—53 |
| 3,347,786 | 10/1967 | Baer et al. | 210—45 |
| 3,484,837 | 12/1969 | Odom et al. | 210—52 |
| 3,578,587 | 5/1971 | Kemmer | 210—52 |

OTHER REFERENCES

Mellor, J. W.: A Comprehensive Treatise, etc., vol. V, 1924, Longmans, Green and Co., New York, pp. 664–668 (P.O.S.L.).

MICHAEL ROGERS, Primary Examiner

U.S. Cl. X.R.

23—22, 61, 109; 162—29, 210—53